United States Patent
Hinton et al.

(10) Patent No.: US 11,941,867 B2
(45) Date of Patent: Mar. 26, 2024

(54) NEURAL NETWORK TRAINING USING THE SOFT NEAREST NEIGHBOR LOSS

(71) Applicant: Google LLC, Mountain View, CA (US)

(72) Inventors: Geoffrey E. Hinton, Toronto (CA); Nicholas Myles Wisener Frosst, Toronto (CA); Nicolas Guy Robert Papernot, Mountain View, CA (US)

(73) Assignee: Google LLC, Mountain View, CA (US)

( * ) Notice: Subject to any disclaimer, the term of this patent is extended or adjusted under 35 U.S.C. 154(b) by 461 days.

(21) Appl. No.: 17/423,612

(22) PCT Filed: Jan. 22, 2020

(86) PCT No.: PCT/US2020/014571
§ 371 (c)(1),
(2) Date: Jul. 16, 2021

(87) PCT Pub. No.: WO2020/154373
PCT Pub. Date: Jul. 30, 2020

(65) Prior Publication Data
US 2022/0101624 A1  Mar. 31, 2022

Related U.S. Application Data

(60) Provisional application No. 62/796,001, filed on Jan. 23, 2019.

(51) Int. Cl.
*G06K 9/62* (2022.01)
*G06N 3/045* (2023.01)
(Continued)

(52) U.S. Cl.
CPC ........... *G06V 10/774* (2022.01); *G06N 3/045* (2023.01); *G06N 3/047* (2023.01)

(58) Field of Classification Search
CPC ...... G06V 10/774; G06N 3/045; G06N 3/047; G06N 3/088; G06N 3/084; G06N 3/02;
(Continued)

(56) References Cited

U.S. PATENT DOCUMENTS 10,453,197 B1 * 10/2019 Cholakkal .............. G06V 20/70
2022/0004883 A1 * 1/2022 Aytar ................. G06F 18/2431

OTHER PUBLICATIONS

Azadi et al, "Auxiliary image regularization for deep CNNs with noisy labels" arXiv, 2015, 11 pages.
(Continued)

*Primary Examiner* — Duy M Dang
(74) *Attorney, Agent, or Firm* — Fish & Richardson P.C.

(57) ABSTRACT

Methods, systems, and apparatus, including computer programs encoded on a computer storage medium, for training a classification neural network. In one aspect, a method comprises: for each of a plurality of network inputs: processing the network input using the classification neural network to generate a classification output that defines a predicted class of the network input; determining a soft nearest neighbor loss, wherein the soft nearest neighbor loss encourages intermediate representations of network inputs of different classes to become more entangled, wherein the entanglement of intermediate representations of network inputs of different classes characterizes how similar pairs of intermediate representations of network inputs of different class are relative to pairs of intermediate representations of network inputs of the same class; and adjusting the current values of the classification neural network parameters using gradients of the soft nearest neighbor loss with respect to the classification neural network parameters.

20 Claims, 7 Drawing Sheets

(51) Int. Cl.
G06N 3/047 (2023.01)
G06V 10/774 (2022.01)
(58) Field of Classification Search
CPC ........ G06N 7/046; G06N 7/023; G06N 20/00; G06K 7/1482; G06T 3/4046; G06T 9/002; G06T 2207/20084; G06T 2207/20081
USPC .................................................. 382/155, 156
See application file for complete search history.

(56) References Cited

OTHER PUBLICATIONS

Biggio et al, "Evasion attacks against machine learning at test time" Springer, 2013, 16 pages.
Chapelle et al, "Semi-supervised learning" review, IEEE, 2009, 1 page.
Cheng et al, "When deep learning meets metric learning: Remote sensing image scene classification via learning discriminative CNNs" IEEE, 2018, 11 pages.
Desautels et al, "Parallelizing exploration-exploitation tradeoffs in gaussian process bandit optimization" JMLR, 2014, 51 pages.
Dou et al, "Metric learning-based generative adversarial network" arXiv, 2017, 9 pages.
Elsayed et al, "Large margin deep networks for classification" arXiv, 2018, 16 pages.
EP Office Action in European Application No. 20707920.3, dated Jun. 29, 2021, 10 pages.
Frosst et al, "Analyzing and Improving Representations with the soft and nearest neighbor loss" arXiv, 2019, 16 pages.
Ghafoorian et al, "El-gan: Embedding loss driven generative adversarial networks for lane detection" arXiv, 2018, 14 pages.
Goldberger et al, "Neighbourhood components analysis" NIPS, 2005, 8 pages.
Golovin et al, "Google vizier: A service for black-box optimization" International Conference on Knowledge Discovery and Data Mining, 2017, 10 pages.
Goodfellow et al, "Explaining and harnessing adversarial example" arXiv, 2014, 10 pages.
Goodfellow et al, "Generative adversarial nets" NIPS, 2014, 9 pages.
Hoffer et al, "Deep metric learning using triplet network" arXiv, 2015, 8 pages.
Huang et al, "An introduction to image synthesis with generative adversarial nets" arXiv, 2018, 17 pages.
Kurakin et al, "Adversarial examples in the physical world" arXiv, 2016, 14 pages.
Maaten et al, "Visualizing data using t-sne" JMLR, 2008, 27 pages.
Madry et al, "Towards deep learning models resistant to adversarial attacks" arXiv, 2017, 27 pages.
Mahloujifar et al, "The curse of concentration in robust learning: Evasion and poisoning attacks from concentration of measure" AAAI-19, 2018, 8 pages.
Moosavi-Dezfooli et al, "Universal adversarial perturbations" arXiv, 2017, 11 pages.
Papernot et al, "Deep k-nearest neighbors: Towards confident, interpretable and robust deep learning" arXiv, 2018, 18 pages.
Papernot et al, "Practical black-box attacks against machine learning" arXiv, 2017, 14 pages.
PCT International Preliminary Report on Patentability in International Application No. PCT/US2020/014571, dated Aug. 5, 2021, 16 pages.
PCT International Search Report and Written Opinion in International Application No. PCT/Us2020/014571, dated May 19, 2020, 23 pages.
Pereyra et al, "Regularizing neural networks by penalizing confident output distributions" arXiv, 2017, 12 pages.
Roweis et al, "Nonlinear dimensionality reduction by locally linear embedding" Science, 2000, 4 pages.
Sabour et al, "Adversarial menupulation of deep representations" arXiv, 2015, 18 pages.
Salakhutdinov et al, "Learning a nonlinear embedding by preserving class neighbourhood structure" AISTATS, 2007, 9 pages.
Srivastava et al, "Dropout: a simple way to precent neural networks from overfitting" JMLR, 2014, 30 pages.
Szegedy et al, "Intriguing properties of neural networks" arXiv, 2013, 9 pages.
Office Action in European Appln. No. 20707920.3, dated Sep. 13, 2023, 11 pages.

* cited by examiner

NEURAL NETWORK TRAINING USING THE SOFT NEAREST NEIGHBOR LOSS

CROSS-REFERENCE TO RELATED APPLICATION

This application is a National Stage Application under 35 U.S.C. § 371 and claims the benefit of International Application No. PCT/US2020/014571, filed Jan. 22, 2020, which claims priority to U.S. Application No. 62/796,001, filed Jan. 23, 2019, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes training systems implemented as computer programs on one or more computers in one or more locations that are configured to train classification neural networks and generative neural networks using a soft nearest neighbor loss.

According to a first aspect there is provided a method performed by one or more data processing apparatus for training a classification neural network, the method including, for each of multiple network inputs, processing the network input using the classification neural network, in accordance with current values of classification neural network parameters, to generate a classification output that defines a predicted class of the network input. A soft nearest neighbor loss is determined based on, for each of multiple pairs of network inputs that include a first network input and a second network input from the multiple network inputs, a respective measure of similarity between: (i) an intermediate representation of the first network input that is generated by one or more hidden layers of the classification neural network by processing the first network input to generate the classification output for the first network input, and (ii) an intermediate representation of the second network input that is generated by one or more hidden layers of the classification neural network by processing the second network input to generate the classification output for the second network input. The soft nearest neighbor loss encourages intermediate representations of network inputs of different classes to become more entangled, where the entanglement of intermediate representations of network inputs of different classes characterizes how similar pairs of intermediate representations of network inputs of different class are relative to pairs of intermediate representations of network inputs of the same class. The current values of the classification neural network parameters are adjusted using gradients of the soft nearest neighbor loss with respect to the classification neural network parameters.

In some implementations, determining the soft nearest neighbor loss includes, for each given network input of the multiple network inputs, determining an intra-class variation for the given network input that characterizes how similar the intermediate representation of the given network input is to intermediate representations of other network inputs of the plurality of network inputs that are of the same class as the given network input. A total variation for the given network input is determined that characterizes how similar the intermediate representation of the given network input is to the intermediate representations of other network inputs of the multiple network inputs that are of any class. A ratio of the intra-class variation and the total variation for the given network input is determined. The soft nearest neighbor loss is determined based on the respective ratios of the intra-class variation and the total variation for each given network input.

In some implementations, determining the intra-class variation for the given network input includes determining:

$$\sum_{j=1\ldots b, j\neq i, y_i=y_j} \exp\left(-\frac{S(x_i, x_j)}{T}\right),$$

where j indexes the network inputs of the multiple network inputs, b is a total number of network inputs in the multiple network inputs, i is an index of the given network input, $y_i$ represents a class of the given network input, $y_j$ represents a class of the network input corresponding to index j, $x_i$ represents the intermediate representation of the given network input, $x_j$ represents the intermediate representation of the network input corresponding to index j, $S(\bullet,\bullet)$ is a similarity measure, and T is a temperature parameter.

In some implementations, determining the total variation for the given network input includes determining:

$$\sum_{j=1\ldots b, j\neq i} \exp\left(-\frac{S(x_i, x_j)}{T}\right),$$

where j indexes the network inputs of the multiple network inputs, b is a total number of network inputs in the multiple network inputs, i is an index of the given network input, $x_i$ represents the intermediate representation of the given network input, $x_j$ represents the intermediate representation of the network input corresponding to index j, $S(\bullet,\bullet)$ is a similarity measure, and T is a temperature parameter.

In some implementations, determining the soft nearest neighbor loss based on the respective ratios of the intra-class variation and the total variation for each given network input includes determining the soft nearest neighbor loss as:

$$-\frac{1}{b}\sum_{i=1}^{b} \log R_i$$

where b is a total number of network inputs in the multiple network inputs, i indexes the given network inputs, and $R_i$ represents the ratio of the intra-class variation and the total variation for the given network input corresponding to index i.

In some implementations, adjusting the current values of the classification neural network parameters using gradients of the soft nearest neighbor loss with respect to the classification neural network parameters includes adjusting a current value of the temperature parameter using a gradient of the soft nearest neighbor loss with respect to the temperature parameter.

In some implementations, the classification output that defines the predicted class of the network input includes a respective likelihood score for each of multiple possible classes, where the likelihood score for a given class indicates a likelihood that the network input is of the given class.

In some implementations, the method further includes determining a classification loss based on the respective classification output that defines the predicted class of each network input. The current values of the classification neural network parameters are adjusted using gradients of the classification loss with respect to the classification neural network parameters.

In some implementations, the classification loss includes a cross-entropy loss.

In some implementations, the multiple pairs of network inputs include every possible pair of network inputs that include a first network input and a second different network input from the plurality of network inputs.

In some implementations, the network inputs are images.

In some implementations, the class of an image defines a category of object depicted in the image.

According to a second aspect there is provided a method performed by one or more data processing apparatus for training a generative neural network to generate synthetic data elements based on a training data set of genuine data elements. The method includes using the generative neural network to generate a set of synthetic data elements in accordance with current values of generative neural network parameters. A set of genuine data elements are obtained from the training data set of genuine data elements. A soft nearest neighbor loss is determined based on, for each of multiple pairs of data elements that include a first data element and a second data element that are from a combined set of data elements including the set of synthetic data elements and the set of genuine data elements, a respective measure of similarity between the first data element and the second data element. The soft nearest neighbor loss encourages data elements of different classes to become more entangled. The class of a data element defines whether the data element is a genuine data element or a synthetic data element. The entanglement of data elements of different classes characterizes how similar pairs of data elements of different class are relative to pairs of data elements of the same class. The current values of the generative neural network parameters are adjusted using gradients of the soft nearest neighbor loss with respect to the generative neural network parameters.

In some implementations, determining the soft nearest neighbor loss includes, for each given data element from the combined set of data elements including the set of synthetic data elements and the set of genuine data elements, determining an intra-class variation for the given data element that characterizes how similar the given data element is to other data elements from the combined set of data elements that are of the same class as the given data element. A total variation is determined for the given data element that characterizes how similar the given data element is to other data elements from the combined set of data elements that are of any class. A ratio of the intra-class variation and the total variation is determined for the given data element. The soft nearest neighbor loss is determined based on the respective ratios of the intra-class variation and the total variation for each given data element.

In some implementations, determining the intra-class variation for the given data element includes determining:

$$\sum_{j=1\ldots b, j\neq i, y_i=y_j} \exp\left(-\frac{S(x_i, x_j)}{T}\right),$$

where j indexes the data elements from the combined set of data elements, b is a total number of data elements in the combined set of data elements, i is an index of the given data element, $y_i$ represents the class of the given data element, $y_j$ represents the class of the data element corresponding to index j, $x_i$ represents the given data element, $x_j$ represents the data element corresponding to index j, $S(\cdot,\cdot)$ is a similarity measure, and T is a temperature parameter.

In some implementations, determining the total variation for the given data element includes determining:

$$\sum_{j=1\ldots b, j\neq i} \exp\left(-\frac{S(x_i, x_j)}{T}\right),$$

where j indexes the data elements from the combined set of data elements, b is a total number of data elements in the combined set of data elements, i is an index of the given data element, $x_i$ represents the given data element, $x_j$ represents the data element corresponding to index j, $S(\cdot,\cdot)$ is a similarity measure, $S(\cdot,\cdot)$ is a similarity measure, and T is a temperature parameter.

In some implementations, determining the soft nearest neighbor loss based on the respective ratios of the intra-class variation and the total variation for each given data element includes determining the soft nearest neighbor loss as:

$$-\frac{1}{b}\sum_{i=1}^{b} \log R_i$$

where b is a total number of data elements in the combined set of data elements, i indexes the given data elements, and $R_i$ represents the ratio of the intra-class variation and the total variation for the given data element corresponding to index i.

In some implementations, adjusting the current values of the generative neural network parameters using gradients of the soft nearest neighbor loss with respect to the generative neural network parameters includes adjusting a current value of the temperature parameter using a gradient of the soft nearest neighbor loss with respect to the temperature parameter.

In some implementations, the data elements are images.

According to a third aspect there is provided a method performed by one or more data processing apparatus for training a generative neural network to generate synthetic data elements based on a training data set of genuine data elements. The method includes using the generative neural network to generate a set of synthetic data elements in accordance with current values of generative neural network parameters. A set of genuine data elements is obtained from the training data set of genuine data elements. For each data element in a combined set of data elements including the set of synthetic data elements and the set of genuine data elements, a discriminator neural network is used to generate an embedding of the data element. A soft nearest neighbor loss is determined based on, for each of multiple pairs of data elements that include a first data element and a second data element that are from the combined set of data elements including the set of synthetic data elements and the set of genuine data elements, a respective measure of similarity between the embedding of the first data element and the embedding of the second data element. The soft nearest neighbor loss encourages embeddings of data elements of different classes to become more entangled. The class of a data element defines whether the data element is a genuine data element or a synthetic data element. The entanglement of embeddings of data elements of different classes characterizes how similar the embeddings of pairs of data elements of different class are relative to the embeddings of pairs of data elements of the same class. The current values of the generative neural network parameters are adjusted using gradients the soft nearest neighbor loss with respect to the generative neural network parameters.

In some implementations, determining the soft nearest neighbor loss includes, for each given data element from the combined set of data elements comprising the set of synthetic data elements and the set of genuine data elements, determining an intra-class variation for the given data element that characterizes how similar the embedding of the given data element is to the embeddings of other data elements from the combined set of data elements that are of the same class as the given data element. A total variation is determined for the given data element that characterizes how similar the embedding of the given data element is to the embeddings of other data elements from the combined set of data elements that are of any class. A ratio of the intra-class variation and the total variation is determined for the given data element. The soft nearest neighbor loss is determined based on the respective ratios of the intra-class variation and the total variation for each given data element.

In some implementations, determining the intra-class variation for the given data element includes determining:

$$\sum_{j=1...b, j \neq i, y_i = y_j} \exp\left(-\frac{S(E(x_i), E(x_j))}{T}\right),$$

where j indexes the data elements from the combined set of data elements, b is a total number of data elements in the combined set of data elements, i is an index of the given data element, $y_i$ represents the class of the given data element, $y_j$ represents the class of the data element corresponding to index j, $E(x_i)$ represents the embedding of the given data element, $E(x_j)$ represents the embedding of the data element corresponding to index j, $S(\cdot,\cdot)$ is a similarity measure, and T is a temperature parameter.

In some implementations, determining the total variation for the given data element includes determining:

$$\sum_{j=1...b, j \neq i} \exp\left(-\frac{S(E(x_i), E(x_j))}{T}\right),$$

where j indexes the data elements from the combined set of data elements, b is a total number of data elements in the combined set of data elements, i is an index of the given data element, E (x represents the embedding of the given data element, $E(x_j)$ represents the embedding of the data element corresponding to index j, $S(\cdot,\cdot)$ is a similarity measure, and T is a temperature parameter.

In some implementations, determining the soft nearest neighbor loss based on the respective ratios of the intra-class variation and the total variation for each given data element includes determining the soft nearest neighbor loss as:

$$-\frac{1}{b}\sum_{i=1}^{b} \log R_i$$

where b is a total number of data elements in the combined set of data elements, i indexes the given data elements, and $R_i$ represents the ratio of the intra-class variation and the total variation for the given data element corresponding to index i.

In some implementations, adjusting the current values of the generative neural network parameters using gradients of the soft nearest neighbor loss with respect to the generative neural network parameters includes adjusting a current value of the temperature parameter using a gradient of the soft nearest neighbor loss with respect to the temperature parameter.

In some implementations, the data elements are images.

In some implementations, the method further includes adjusting current values of discriminator neural network parameters using gradients of the soft nearest neighbor loss with respect to the discriminator neural network parameters.

In some implementations, adjusting the current values of the discriminator neural network parameters encourages the discriminator neural network to generate embeddings of data elements of different classes that are less entangled.

According to a fourth aspect there is provided a method performed by one or more data processing apparatus for classifying data, the method including: providing input data to a classification neural network, the classification neural network having been trained by performing the method of the first aspect; classifying the input data using the classification neural network; and receiving a classification output from the classification neural network, the output being indicative of the class of the input data.

According to a fifth aspect there is provided a method performed by one or more data processing apparatus for generating synthetic data, the method including: providing input data to a generative neural network, the generative neural network having been trained by performing the method of the second or third aspect; generating synthetic data, based on the input data, using the generative neural network; and receiving the synthetic data from the generative neural network.

According to a sixth aspect there is provided a system including one or more computers and one or more storage devices storing instructions that when executed by the one or more computers cause the one or more computers to perform the respective operations of the described methods.

According to a sixth aspect, there is provided a computer program product storing instructions that when executed by one or more computers cause the one or more computers to perform the respective operations of the described methods.

Particular embodiments of the subject matter described in this specification can be implemented so as to realize one or more of the following advantages.

This specification describes a discriminative training system that trains a classification neural network using a soft nearest neighbor loss that encourages intermediate representations (i.e., that are generated by hidden layers of the classification neural network) of network inputs from different classes to become more entangled. The soft nearest neighbor loss may cause intermediate representations of network inputs to characterize class-independent features capturing information that improves classification accuracy, thereby regularizing the classification neural network and improving its capacity to generalize, i.e., to achieve an acceptable prediction accuracy on network inputs that were not used during training. A feature may be referred to as "class-independent" if the value of the feature may be similar for network inputs of different classes. By acting as a regularizer, the soft nearest neighbor loss may also enable the classification network to be trained using less training data, over fewer training iterations, or both, thereby reducing consumption of computational resources (e.g., memory and computing power).

This specification also describes a generative training system that can train a generative neural network using a soft nearest neighbor loss that encourages "synthetic" data elements generated by the generative neural network to be become more entangled with "genuine" data elements from a training data set. Training the generative neural network using the soft nearest neighbor loss enables the generative neural network to generate "realistic" synthetic data elements, i.e., synthetic data elements having similar characteristics to the genuine data elements in the training data set. The soft nearest neighbor loss may enable the generative neural network to be trained using less training data, over fewer training iterations, or both. Therefore, the generative training system may consume fewer computational resources (e.g., memory and computing power) in training the generative neural network than some conventional training systems that do not use a soft nearest neighbor loss.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As used throughout this specification, for a set of data points that are each associated with a respective class, the "entanglement" of data points of different classes character-izes how similar pairs of data points of different classes are relative to pairs of data points of the same class.

A data point refers to an ordered collection of numerical values, e.g., a vector or matrix of numerical values, which may represent, e.g., an image, a segment of audio data, or a portion of text. In one example, a data point may be an intermediate representation of a network input that is generated by one or more hidden layers of a neural network by processing the network input; in another example, a data point may be an embedding of a network input that is generated by the output layer of a neural network by processing the network input.

The class of a data point refers to a label for the data point (e.g., in the case of a data point that represents an image, the class of the data point may specify a category of object depicted in the image). The similarity between pairs of data points may be measured using a numerical similarity measure, e.g., a Euclidean similarity measure or cosine similarity measure.

Figure 1:
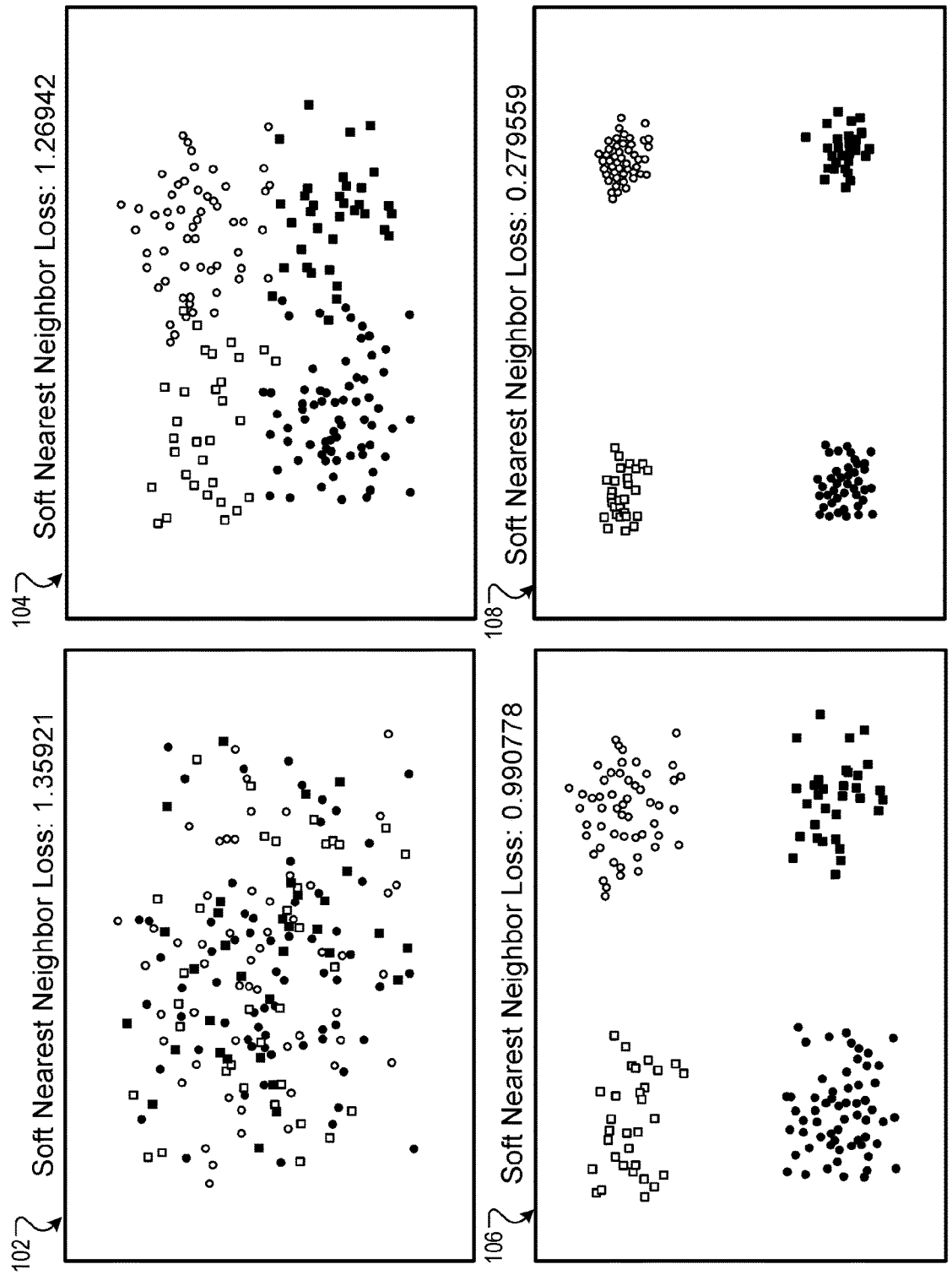
FIG. 1 includes four panels which each illustrate a set of data points and an associated soft nearest neighbor loss value that measures the entanglement of data points of different classes.

FIG. 1 includes four panels (i.e., panels 102, 104, 106, and 108) which each illustrate a set of data points, where the class of each data point is distinguished by its shape and color. Each panel is also associated with a soft nearest neighbor loss value that measures the entanglement of data points of different classes. Panel 102 illustrates data points with the highest soft nearest neighbor loss, i.e., the highest entanglement, and panel 108 illustrates data points with the lowest soft nearest neighbor loss, i.e., the lowest entanglement. It can be appreciated that the data points with low entanglement illustrated in panel 108 are grouped into class-homogenous clusters, whereas the data points with high entanglement illustrated in panel 102 are not.

This specification describes a discriminative training system that uses a soft nearest neighbor loss to train a classification neural network that is configured to process a network input to generate a corresponding classification output that predicts the class of the network input. Training the classification neural network using the soft nearest neighbor loss encourages intermediate representations (i.e., that are generated by hidden layers of the classification neural network) of network inputs from different classes to become more entangled. The soft nearest neighbor loss may regularize the classification neural network by encouraging intermediate representations of network inputs to characterize class-independent features capturing information that improves classification accuracy. The soft nearest neighbor loss may be added as an additional term to a classification loss that encourages the classification neural network to generate classification outputs that match target outputs specifying the classes of network inputs.

This specification further describes a generative training system that uses a soft nearest neighbor loss to train a generative neural network that is configured to generate "synthetic" data elements having similar characteristics to "genuine" data elements from a training data set. Training the generative neural network using the soft nearest neighbor loss may encourage synthetic data elements (or embeddings thereof) and genuine data elements (or embeddings thereof) to become more entangled. Increasing the entanglement between synthetic and genuine data elements may increase the realism of the synthetic data elements, e.g., by increasing their resemblance to genuine data elements.

These features and other features are described in more detail below.

Figure 2:
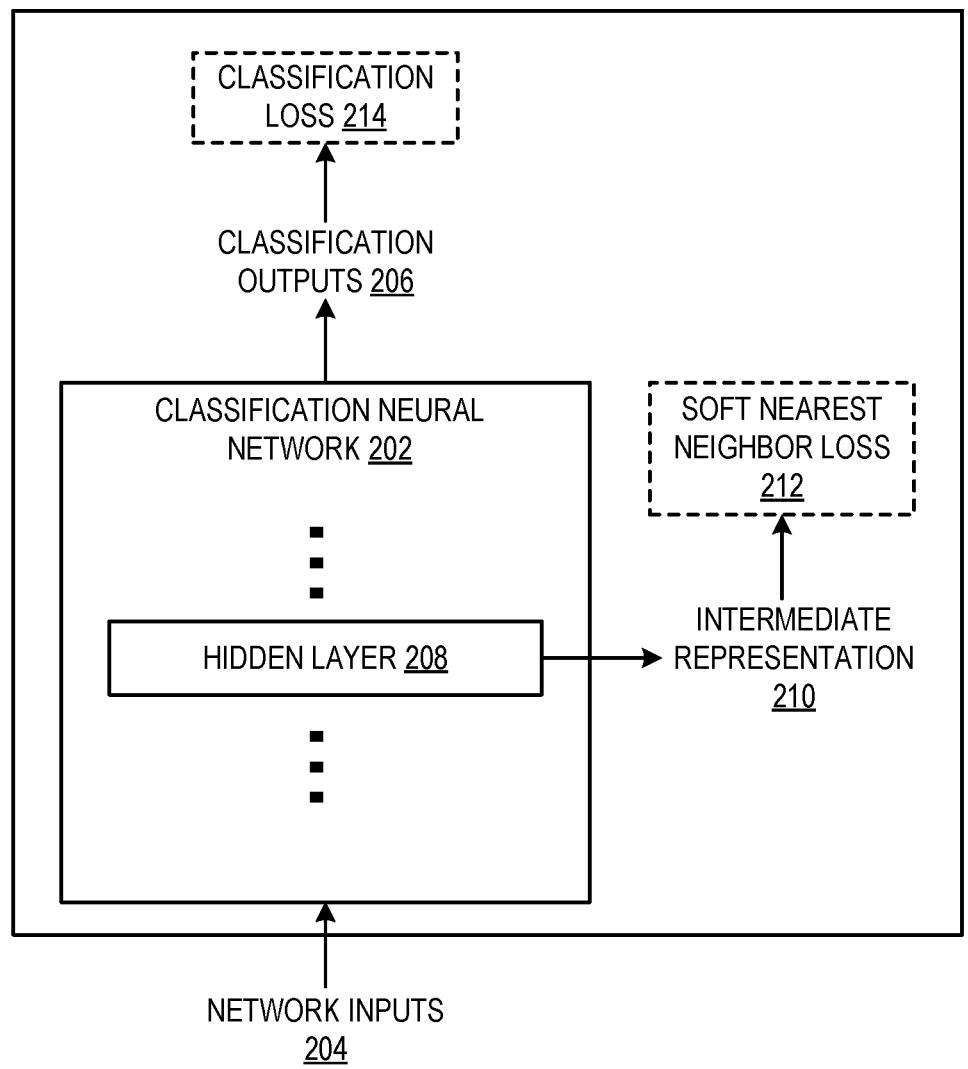
FIG. 2 shows an example discriminative training system.

FIG. 2 shows an example discriminative training system 200. The discriminative training system 200 is an example of a system implemented as computer programs on one or more computers in one or more locations in which the systems, components, and techniques described below are implemented.

The discriminative training system 200 trains the classification neural network 202. The classification neural network 202 is configured to process a network input 204 to generate a corresponding classification output 206 that defines a predicted class of the network input 204. The network input can be any kind of digital data input, e.g., image data, video data, audio data, or textual data. The classification output may include a respective score for each of multiple possible classes, where the score for a class indicates the likelihood that the network input is from the class; the predicted class of the network input may be identified as the class having the highest score.

In one example, the network input may be an image or features derived from an image and the class of the network input may specify a category of the image. For example, the class of an image may specify whether the image depicts a particular type of object, e.g., vehicle, pedestrian, road sign, etc. As another example, the class of a medical image may specify a medical condition of a patient depicted in the medical image. As another example, the class of an image may specify whether the image depicts inappropriate (e.g., offensive) content. As another example, the class of an image may specify a type of action (e.g., sitting, standing, running, etc.) being performed by a person depicted in the image.

In another example, the network input may be a sequence of text and the class of the network input may specify an intent expressed by the network input, e.g., an intent to perform a certain action.

In another example, the network input may be a sequence of audio data samples, and the class of the network input may specify a phoneme or grapheme corresponding to the audio data samples.

In another example, the network input may be an Internet resource (e.g., web page) or a document (or a portion thereof, or features extracted thereof), and the class of the network input may specify a topic of the network input.

The classification neural network can have any appropriate neural network architecture, e.g., a feedforward architecture or a recurrent architecture, and can include any appropriate sort of neural network layers or blocks, e.g., fully-connected layers, convolutional layers, or residual blocks. Generally, the classification neural network includes one or more hidden layers 208, i.e., layers that follow the input layer(s) and precede the output layer(s) in the architecture of the classification neural network. An output layer refers to a neural network layer that generates the classification output of the classification neural network, i.e., a layer that generates the class scores indicating the likelihood that the network input is from each class.

The discriminative training system 200 trains the classification neural network 202 over multiple training iterations on a set of training data that includes multiple training examples. Each of the training examples specifies: (i) a network input, and (ii) a target (i.e., actual) class of the network input. At each training iteration, the discriminative training system 200 may obtain (e.g., sample) a current "batch" (i.e., set) of training examples from the training data, and process the network input 204 specified by each training example to generate: (i) an intermediate representation 210 of the network input 204, and (ii) a classification output 206 for the network input 204. The intermediate representation 210 of the network input 204 refers to an output generated by one or more hidden layers 208 of the classification neural network by processing the network input. The intermediate representation 210 may be represented as an ordered collection of numerical values, e.g., a vector or matrix of numerical values. In one example, the intermediate representation 210 of the network input 214 may be the output of a designated hidden layer 208 of the classification neural network. In another example, the intermediate representation 210 of the network input 214 may be a combination (e.g., concatenation) of the outputs of multiple designated hidden layers of the classification neural network.

After processing the current batch of network inputs 204 from the training data, the discriminative training system 200 updates the current parameter values of the classification neural network using one or both of: (i) a soft nearest neighbor loss 212, and (ii) a classification loss 214. In particular, the discriminative training system 200 updates the current parameter values of the classification neural network using gradients of the soft nearest neighbor loss 212, the classification loss 214, or both, with respect to the current parameter values of the classification neural network. For example, the discriminative training system 200 may update the current parameter values of the classification neural network using gradients of a composite loss function $\mathcal{L}$ given by:

$$\mathcal{L} = -(\mathcal{L}_c + \alpha \cdot \mathcal{L}_{sn}) \quad (1)$$

where $\mathcal{L}_c$ is the classification loss, $\mathcal{L}_{sn}$ is the soft nearest neighbor loss, and $\alpha > 0$ is a hyper-parameter controlling the relative importance of the classification loss and the soft nearest neighbor loss. In other examples, the composite loss function may include multiple soft nearest neighbor losses, with each soft nearest neighbor loss corresponding to intermediate outputs generated by a respective hidden layer of the classification neural network. That is, the discriminative training system 200 may generate multiple intermediate representations of each network input, and the composite loss function may include a respective soft nearest neighbor loss corresponding to each of these intermediate representations.

The discriminative training system 200 may compute the gradients of the soft nearest neighbor loss 212 and the classification loss 214 using backpropagation techniques, and update the current parameter values of the classification neural network 202 using any appropriate gradient descent optimization procedure, e.g., RMSprop or Adam.

Updating the current parameter values of the classification neural network 202 using the soft nearest neighbor loss 212 encourages intermediate representations 210 of network inputs 204 of different classes to become more entangled. That is, the soft nearest neighbor loss 212 encourages an increase in similarity between pairs of intermediate representations of network inputs 204 of different classes relative to pairs of intermediate representations of network inputs of the same class. Example techniques for computing the soft nearest neighbor loss 212 are described in more detail with reference to FIG. 5.

Updating the current parameter values of the classification neural network 202 using the classification loss 214 encourages classification outputs 206 for network inputs 204 to match the target classes specified by the training examples. The classification loss 214 may be, e.g., a cross entropy loss.

Using the soft nearest neighbor loss 212 may improve the capacity of the trained classification neural network to generalize from the training data to previously unseen network inputs, i.e., may increase the accuracy of the classification neural network on network inputs that were not used to train the classification neural network. In particular, the soft nearest neighbor loss may regularize the classification neural network by encouraging intermediate representations of network inputs to characterize class-independent features capturing information that improves classification accuracy. In the absence of the soft nearest neighbor loss, intermediate representations of network inputs may form class-homogenous clusters (i.e., groups of intermediate representations that are from mostly the same class); if the intermediate representation of a network input is not represented in one of these class-homogenous clusters, the classification output may be inaccurate. The soft nearest neighbor loss discourages the formation of class-homogenous clusters of intermediate representations, and may thereby improve the generalization and robustness of the classification neural network.

In addition to regularizing the training of the classification neural network, using the soft nearest neighbor loss may also facilitate determining the confidence of class predictions generated by the classification neural network for "test" network inputs, i.e., that are not training network inputs included in the training data. To determine the confidence of a class prediction generated for a test network input, a predefined number K of intermediate representations of training network inputs that are most similar (i.e., closest) to the intermediate representation of the test network input may be identified. The confidence of the class prediction for the test network input may then be determined based on fraction of the K nearest intermediate representations that share the same class as the predicted class of the test network input. Generally, a higher fraction of the K nearest intermediate representations sharing the same class as the predicted class of the test network input indicates a higher confidence in the class prediction for the test network input, and vice versa.

Using the soft nearest neighbor loss may increase the correlation between the confidence of class predictions and the accuracy of class predictions by discouraging the formation of class-homogenous clusters of intermediate representations, as discussed above. This is particularly important when the classification neural network is likely to be presented with outlier test data, for example, in a medical diagnostics environment (where a patient could be afflicted by an unknown condition), or due to adversarial attacks. In an adversarial attack, network inputs are provided to the classification neural network in an attempt to cause the classification neural network to generate inaccurate class predictions. By facilitating the assessment of the confidence of class predictions generated by the classification neural network, the soft nearest neighbor loss may improve the security of a computer system that uses the classification neural network, e.g., by making the classification neural network (and by extension, the computer system) less prone to adversarial attacks by malicious actors.

Using the soft nearest neighbor loss may deal better with outlier data that is different from the training data used to train the classification neural network. Data that is not from the training distribution can be recognized by observing that in the hidden layers, it has fewer than the normal number of neighbors from the predicted class. In one example, this can allow adversarial attacks to be detected. In another example, this can be used to assist with medical diagnostics when a patient has an unknown condition.

Figure 3:
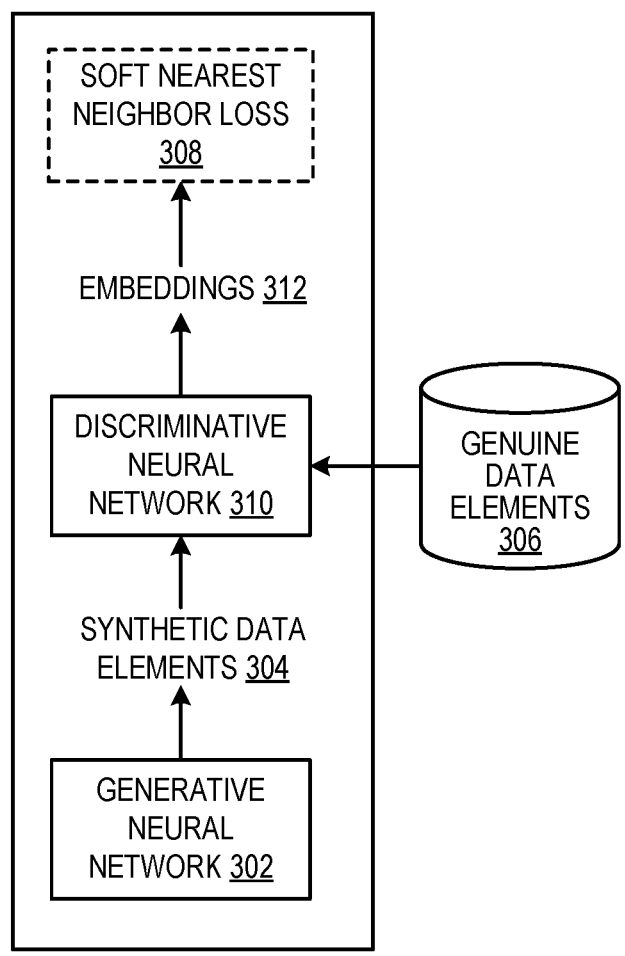
FIG. 3 shows an example generative training system.

FIG. 3 shows an example generative training system 300. The generative training system 300 is an example of a system implemented as computer programs on one or more computers in one or more locations in which the systems, components, and techniques described below are implemented.

The generative training system 300 trains the generative neural network 302 to generate "synthetic" data elements 304 having similar characteristics to a training data set of "genuine" data elements 306 using a soft nearest neighbor loss 308. The data elements may be, e.g., images, text segments, or audio segments.

Generally, the generative neural network 302 can have any appropriate neural network architecture that enables it to generate data elements, and the generative neural network 302 can generate data elements in any of a variety of ways. In one example, to generate a synthetic data element 304, the generative neural network 302 may process a latent variable that is sampled from a probability distribution over a space of latent variables. In this example, the space of latent variables may be, e.g., the set of real numbers, and the probability distribution over the latent space may be, e.g., a Normal (0,1) probability distribution. In another example, to generate a synthetic data element 304, the generative neural network 302 may generate a probability distribution over the space of space of possible data elements, and sample the synthetic data element in accordance with the probability distribution.

The generative training system 300 trains the generative neural network over multiple training iterations. At each training iteration, the generative training system 300 uses the generative neural network 302 to generate a current batch (set) of synthetic data elements 304, and obtains (e.g., samples) a current batch (set) of genuine data elements 306. The generative training system 300 provides the current synthetic data elements 304 and genuine data elements 306 as respective inputs to a discriminative neural network 310 (which may also be referred to as a "discriminator" neural network), that is configured to process an input data element to generate an embedding 312 of the input data element. An embedding of a data element refers to a representation of the data element as an ordered collection of numerical values, e.g., a vector or matrix of numerical values. The discriminative neural network 310 can have any appropriate neural network architecture that enables it to generate embeddings, e.g., a fully-connected or convolutional neural network architecture.

After generating embeddings 312 of the current synthetic and genuine data elements, the generative training system 300 updates the current parameter values of the generative neural network using a soft nearest neighbor loss 308. In particular, the generative training system 300 updates the current parameter values of the generative neural network using gradients of the soft nearest neighbor loss 308 with respect to the current parameter values of the generative neural network. The generative training system 300 may compute the gradients of the soft nearest neighbor loss 308 using backpropagation techniques, and update the current parameter values of the generative neural network 302 using any appropriate gradient descent optimization procedure, e.g., RMSprop or Adam.

Generally, the soft nearest neighbor loss 308 is based on, for each of multiple pairs of data elements (e.g., pairs of data elements including two genuine data elements, two synthetic data elements, or a genuine data element and a synthetic data element), a measure of similarity between the embeddings 312 of the data elements in the pair. Updating the current parameter values of the generative neural network 302 using the soft nearest neighbor loss 308 encourages embeddings 312 of synthetic data elements 304 and genuine data elements 306 to become more entangled. That is, if the class of a data element is understood to define whether the data element is synthetic or genuine, the soft nearest neighbor loss 308 encourages an increase in similarity between pairs of embeddings 312 of data elements of different classes relative to pairs of embeddings of data elements of the same class. Example techniques for computing the soft nearest neighbor loss 308 are described in more detail with reference to FIG. 5.

The generative training system 300 trains the discriminative neural network 310 in tandem with the generative neural network 302, e.g., by alternating between training the discriminative neural network 310 and the generative neural network 302. In particular, at each of multiple training iterations, the generative training system 300 uses the discriminative neural network to generate embeddings 312 of synthetic data elements 304 and genuine data elements 306. The generative training system 300 then updates the current parameter values of the discriminative neural network using the soft nearest neighbor loss 308 to encourage embeddings 312 of synthetic data elements 304 and genuine data elements 306 to become less entangled.

Over the course of training, the generative neural network 302 becomes continually better at generating synthetic data samples having embeddings that are more entangled with the embeddings of genuine data samples. In tandem, the discriminative neural network continually adapts to cause embeddings of synthetic data elements to be less entangled with embeddings of the genuine data elements. The adversarial training of the generative neural network 302 and the discriminative neural network 310 results in the synthetic data elements 304 generated by the generative neural network 302 having characteristics that are increasingly similar to those of the genuine data elements 306.

The discriminative neural network 310 enables the generative training system 300 to evaluate the entanglement of synthetic and genuine data elements in a learned embedding space, which can facilitate more effective training of the generative neural network 302. However, in simplified implementations, the generative training system 300 may refrain from using the discriminative neural network 310. In these implementations, the generative training system 300 may train the generative neural network 302 by using the soft nearest neighbor loss 308 to encourage the synthetic data elements to become more entangled with the genuine data elements, i.e., in the data element space rather than in an embedding space. That is, in these implementations, the soft nearest neighbor loss is based on, for each of multiple pairs of data elements (e.g., pairs of data elements including two genuine data elements, two synthetic data elements, or a genuine data element and a synthetic data element), a measure of similarity between the data elements in the pair. If the class of a data element is understood to define whether the data element is synthetic or genuine, the soft nearest neighbor loss encourages an increase in similarity between pairs of data elements of different classes relative to pairs of data elements of the same class. Example techniques for computing the soft nearest neighbor loss are described in more detail with reference to FIG. 5.

Figure 4:
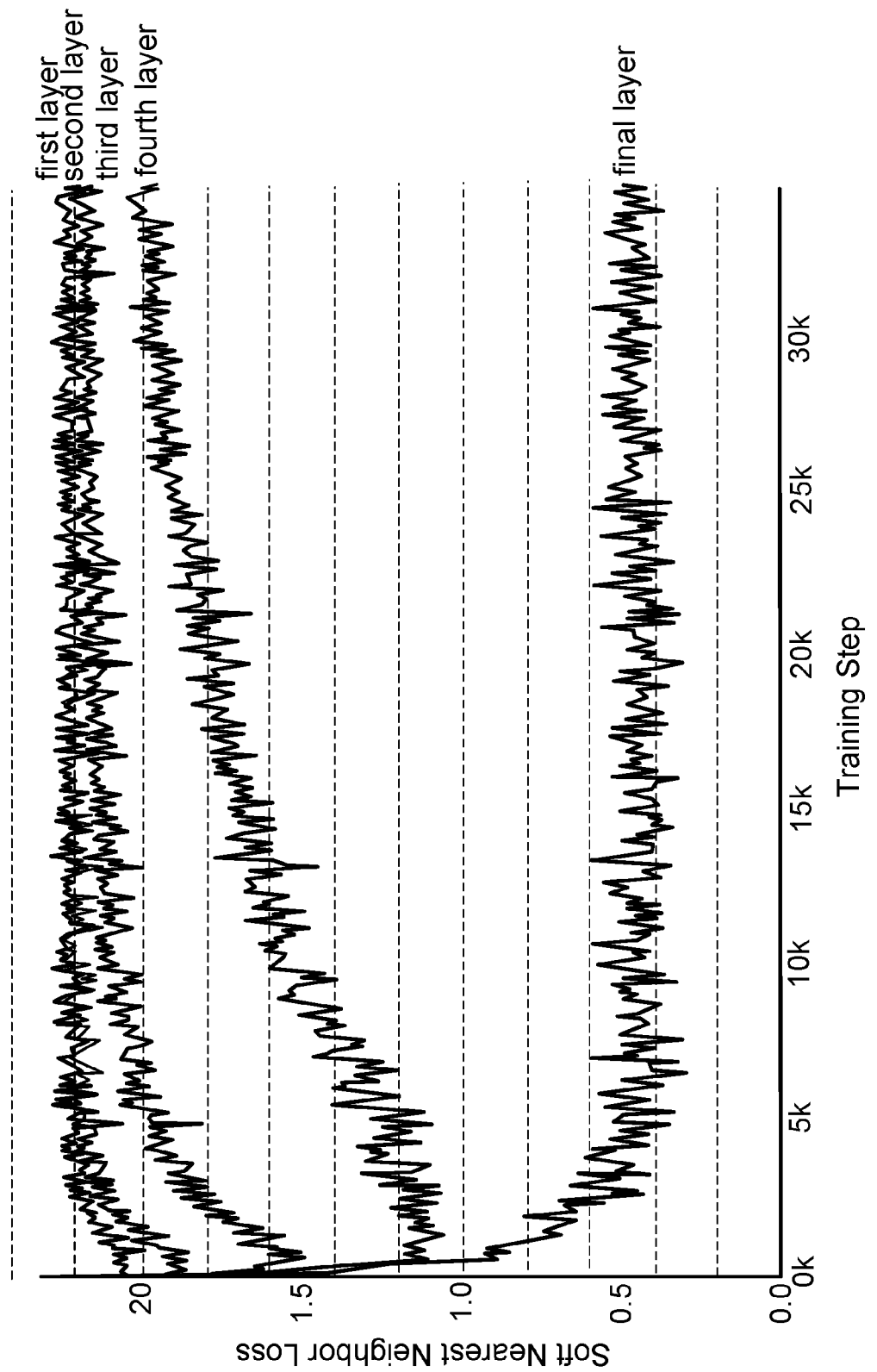
FIG. 4 shows a graph that indicates the entanglement of intermediate representations of network inputs of different classes generated by hidden layers in a classification neural network.

FIG. 4 shows a graph that indicates the entanglement (measured by the soft nearest neighbor loss) of intermediate representations of network inputs of different classes generated by a sequence of layers in a classification neural network (in particular, the layers in the last block of a ResNet trained on the CIFAR-10 training data set). It can be appreciated that over the course of training using a soft nearest neighbor loss, the entanglement of intermediate representations of each layer generally increases, except for the output layer (labeled as the "final layer" in FIG. 4). The soft nearest neighbor loss is not applied to the output layer, thereby allowing the output layer to remain discriminative.

Figure 5:
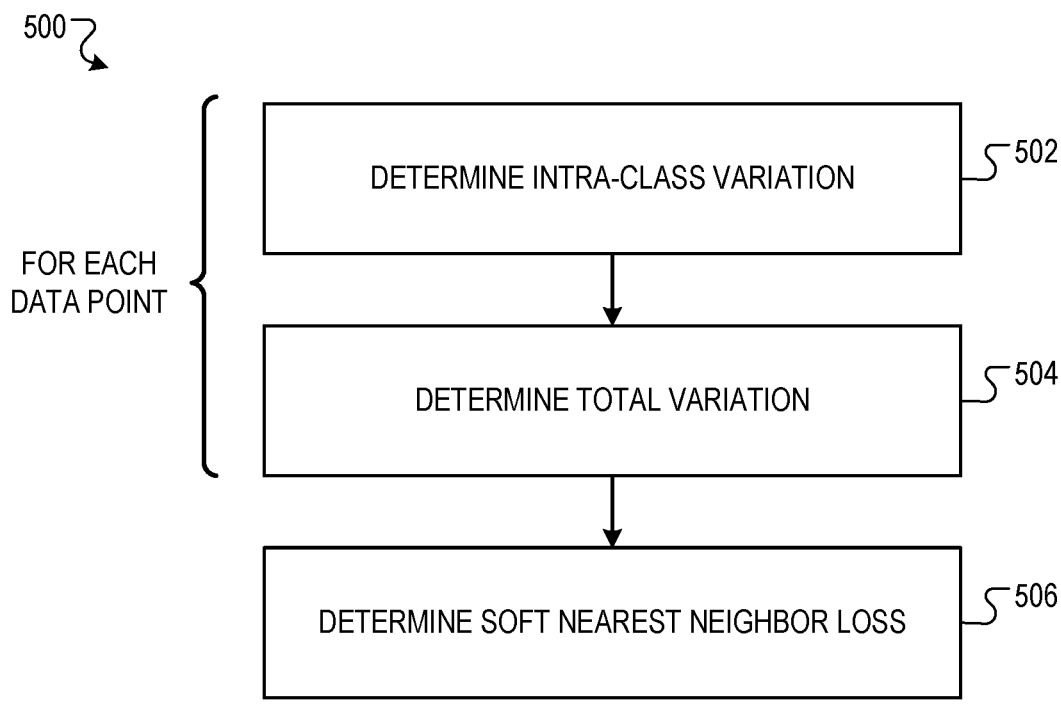
FIG. 5 is a flow diagram of an example process for computing the soft nearest neighbor loss for a set of data points that are each associated with a respective class.

FIG. 5 is a flow diagram of an example process 500 for computing the soft nearest neighbor loss for a set of data points that are each associated with a respective class. For convenience, the process 500 will be described as being performed by a system of one or more computers located in one or more locations. For example, a training system, e.g., the discriminative training system 200 of FIG. 2 or the generative training system 300 of FIG. 3, appropriately programmed in accordance with this specification, can perform the process 500.

The process 500 is described with reference to a set of data points that are each associated with a respective class. In one example, each data point may be an intermediate output generated by a hidden layer of a classification neural network by processing a network input from a current batch of network inputs during training of the classification neural network, and the class of each data point may be the class of the corresponding network input, as described with reference to FIG. 2. In another example, each data point may be a data element or an embedding of a data element from a current batch of data elements during training of a generative neural network, and the class of each data point may indicate whether the data element is genuine or synthetic (i.e., generated by the generative neural network), as described with reference to FIG. 3.

The system determines a respective intra-class variation for each data point (502). The intra-class variation for a given data point characterizes how similar the given data point is to other data points that are of the same class as the given data point. In one example, the system may determine the intra-class variation for a given data point as:

$$\sum_{j=1...b, j\neq i, y_i=y_j} \exp\left(-\frac{S(p_i, p_j)}{T}\right) \quad (2)$$

where j indexes the data points, b is the total number of data points (e.g., corresponding to a current batch of data points), i is the index of the given data point, $y_i$ represents the class of the given data point (e.g., indicating whether data point i corresponds to a real or synthetic data element), $y_j$ represents the class of the data point corresponding to index j (e.g., indicating whether data point j corresponds to a real or synthetic data element), $p_i$ represents the given data point, $p_j$ represents the data point corresponding to index j, $S(\bullet,\bullet)$ is a similarity measure (e.g., $S(p_i,p_j)=|p_i-p_j|^2$), and T is a temperature parameter which controls the relative importance given to the similarities between pairs of data points.

The system determines a respective total variation for each data point (504). The total variation for a given data point characterizes how similar the data point is to other data points that are of any class. In one example, the system may determine the total variation for a given data point as:

$$\sum_{j=1...b, j\neq i} \exp\left(-\frac{S(p_i, p_j)}{T}\right) \quad (3)$$

where j indexes the data points, b is the total number of data points, i is the index of the given data point, $p_i$ represents the given data point, $p_j$ represents the data point corresponding to index j, $S(\cdot,\cdot)$ is a similarity measure (e.g., $S(p_i,p_j)=|p_i-p_j|^2$), and T is a temperature parameter which controls the relative importance given to the similarities between pairs of data points.

The system determines the soft nearest neighbor loss based on the respective ratio of the intra-class variation and the total variation for each data point (506). For example, the system may determine the soft nearest neighbor loss $\mathcal{L}_{sn}(T)$ as:

$$\mathcal{L}_{sn}(T) = -\frac{1}{b}\sum_{i=1}^{b} \log R_i \qquad (4)$$

where b is the total number of data points, i indexes the data points, $R_i$ represents the ratio of the intra-class variation and the total variation for the data point corresponding to index i, and $\mathcal{L}_{sn}$ is expressed as a function of the temperature parameter T (which is described above).

It can be seen from equations (2) to (4) that the soft nearest neighbor loss uses all data points in a batch of b data points. This results in the intermediate representations becoming more entangled than those produced by other loss functions, which may be based on a single positive data point and a single negative data point.

In some implementations, the system may determine the soft nearest neighbor loss $\mathcal{L}_{sn}$ as the minimum over all temperatures, i.e.:

$$\mathcal{L}_{sn} = \operatorname*{argmin}_{T \in \mathbb{R}} \mathcal{L}_{sn}(T) \qquad (5)$$

where $\mathcal{L}_{sn}(T)$ is described with reference to equation (4). The soft nearest neighbor loss $\mathcal{L}_{sn}$ (described with reference to equation (5)) can be approximated during training of a discriminative neural network or a generative neural network (as described above) by initializing T to a predetermined value and optimizing with gradient descent over T to minimize the soft nearest neighbor loss, i.e., by adjusting the current value of T using a gradient of the soft nearest neighbor loss with respect to T. That is, during training of a discriminative neural network or a generative neural network, the value of T is jointly adjusted with the parameter values of the discriminative neural network or the generative neural network to optimize the soft nearest neighbor loss. Determining the soft nearest neighbor loss as the minimum over all temperatures obviates any requirement to manually set the value of the temperature hyper-parameter, e.g., through trial-and-error testing.

Figure 6:
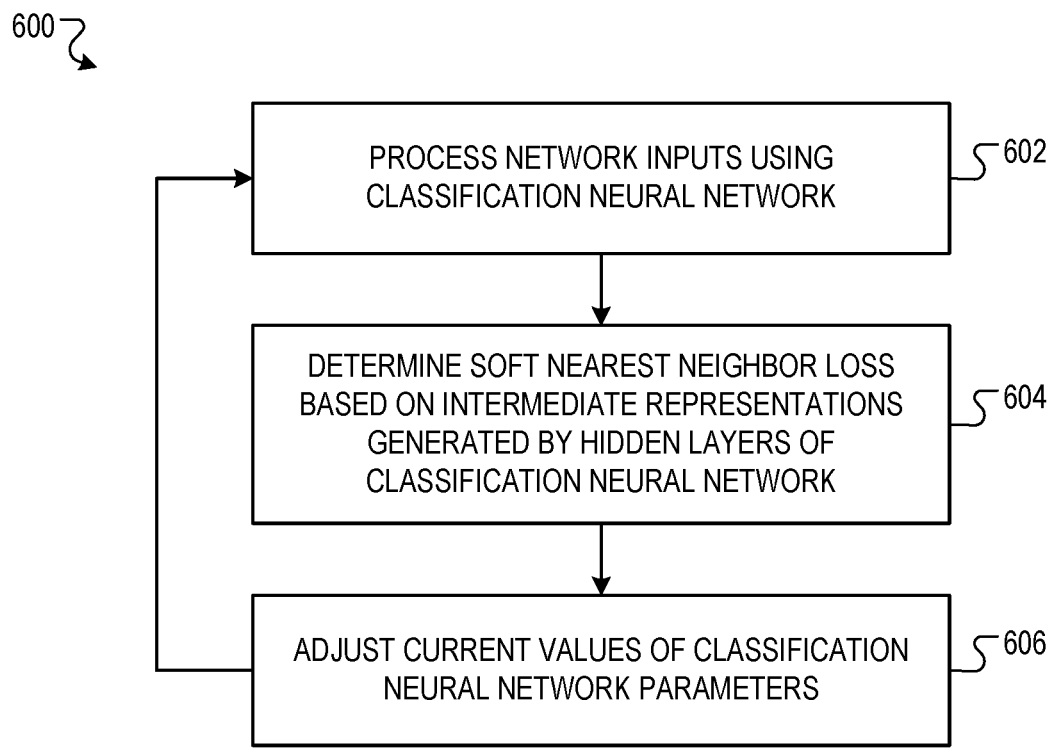
FIG. 6 is a flow diagram of an example process for training a classification neural network using a soft nearest neighbor loss.

FIG. 6 is a flow diagram of an example process 600 for training a classification neural network using a soft nearest neighbor loss. For convenience, the process 600 will be described as being performed by a system of one or more computers located in one or more locations. For example, a training system, e.g., the discriminative training system 200 of FIG. 2, appropriately programmed in accordance with this specification, can perform the process 600.

The system processes each of multiple network inputs using the classification neural network (602). The classification neural network is configured to process a network input to generate a classification output that defines a predicted class of the network input.

The system determines a soft nearest neighbor loss (604). The system determines the soft nearest neighbor loss based on, for each of multiple pairs of network inputs that include a first network input and a second network input, a respective measure of similarity between: (i) an intermediate representation of the first network input, and (ii) an intermediate representation of the second network input.

The system adjusts the current values of the classification neural network parameters using gradients of the soft nearest neighbor loss with respect to the classification neural network parameters (606). The soft nearest neighbor loss encourages intermediate representations of network inputs of different classes to become more entangled.

After adjusting the current values of the classification neural network parameters, the system may return to step 602 to perform another training iteration. The system may determine that training is complete when a training termination criterion is satisfied, e.g., when a predetermined number of training iterations have been performed, or when the accuracy of the classification neural network on a set of validation data achieves a predefined threshold.

Figure 7:
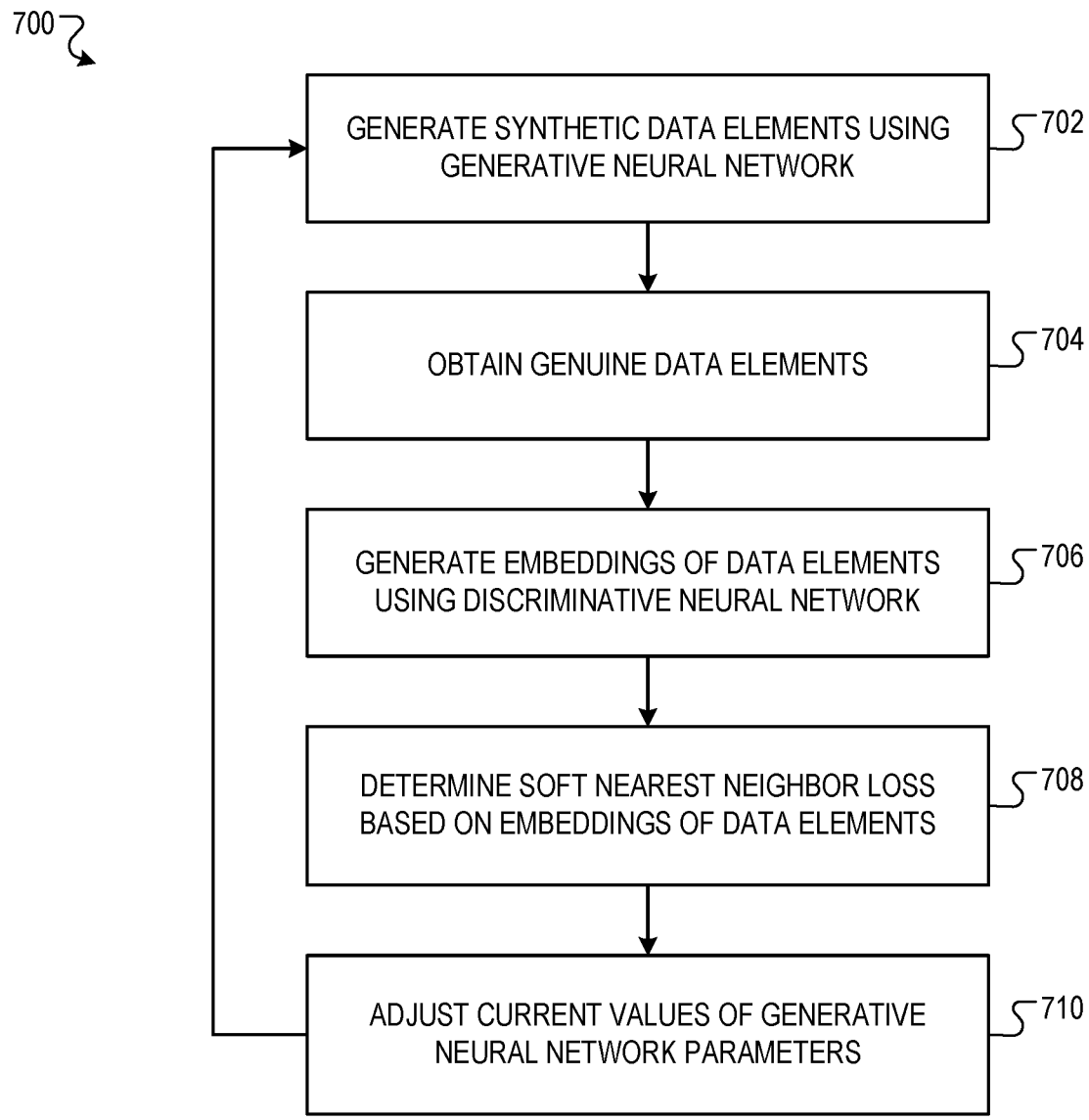
FIG. 7 is a flow diagram of an example process for training a generative neural network using a soft nearest neighbor loss.

FIG. 7 is a flow diagram of an example process 700 for training a generative neural network using a soft nearest neighbor loss. For convenience, the process 700 will be described as being performed by a system of one or more computers located in one or more locations. For example, a training system, e.g., the generative training system 300 of FIG. 3, appropriately programmed in accordance with this specification, can perform the process 700.

The system uses the generative neural network to generate a current set of synthetic data elements (702).

The system obtains a current set of genuine data elements from a training data set of genuine data elements, e.g., by sampling a predefined number of genuine data elements from the training data set (704).

The system uses a discriminative neural network to generate a respective embedding of each data element in a combined set of data elements that includes the current set of synthetic data elements and the current set of genuine data elements (706).

The system determines a soft nearest neighbor loss (708). The system determines the soft nearest neighbor loss based on, for each of multiple pairs of data elements that include a first data element and a second data element from the combined set of data elements, a respective measure of similarity between the embedding of the first data element and the embedding of the second data element.

The system adjusts the current values of the generative neural network parameters using gradients of the soft nearest neighbor loss with respect to the generative neural network parameters (710). The soft nearest neighbor loss encourages embeddings of synthetic data elements and embeddings of genuine data elements to become more entangled.

After adjusting the current values of the generative neural network parameters, the system may return to step 702 to perform another training iteration. The system may determine that training is complete when a training termination criterion is satisfied, e.g., when a predetermined number of training iterations have been performed.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for training a classification neural network, the method comprising:
for each of a plurality of network inputs:
processing the network input using the classification neural network, in accordance with current values of classification neural network parameters, to generate a classification output that defines a predicted class of the network input;
determining a soft nearest neighbor loss based on, for each of a plurality of pairs of network inputs that comprise a first network input and a second network input from the plurality of network inputs, a respective measure of similarity between:
(i) an intermediate representation of the first network input that is generated by one or more hidden layers of the classification neural network by processing the first network input to generate the classification output for the first network input, and
(ii) an intermediate representation of the second network input that is generated by one or more hidden layers of the classification neural network by processing the second network input to generate the classification output for the second network input;
wherein the soft nearest neighbor loss encourages intermediate representations of network inputs of different classes to become more entangled, wherein the entanglement of intermediate representations of network inputs of different classes characterizes how similar pairs of intermediate representations of network inputs of different class are relative to pairs of intermediate representations of network inputs of the same class; and
adjusting the current values of the classification neural network parameters using gradients of the soft nearest neighbor loss with respect to the classification neural network parameters.

2. The method of claim 1, wherein determining the soft nearest neighbor loss comprises:
for each given network input of the plurality of network inputs:
determining an intra-class variation for the given network input that characterizes how similar the intermediate representation of the given network input is to intermediate representations of other network inputs of the plurality of network inputs that are of the same class as the given network input;
determining a total variation for the given network input that characterizes how similar the intermediate representation of the given network input is to the intermediate representations of other network inputs of the plurality of network inputs that are of any class; and
determining a ratio of the intra-class variation and the total variation for the given network input; and
determining the soft nearest neighbor loss based on the respective ratios of the intra-class variation and the total variation for each given network input.

3. The method of claim 2, wherein determining the intra-class variation for the given network input comprises determining:

$$\sum_{j=1\ldots b, j\neq i, y_i=y_j} \exp\left(-\frac{S(x_i, x_j)}{T}\right),$$

where j indexes the network inputs of the plurality of network inputs, b is a total number of network inputs in the plurality of network inputs, i is an index of the given network input, $y_j$ represents a class of the given network input, $y_j$ represents a class of the network input corresponding to index j, $x_i$ represents the intermediate representation of the given network input, $x_j$ represents the intermediate representation of the network input corresponding to index is a similarity measure, and T is a temperature parameter.

4. The method of claim 3, wherein adjusting the current values of the classification neural network parameters using gradients of the soft nearest neighbor loss with respect to the classification neural network parameters comprises:
adjusting a current value of the temperature parameter using a gradient of the soft nearest neighbor loss with respect to the temperature parameter.

5. The method of claim 2, wherein determining the soft nearest neighbor loss based on the respective ratios of the intra-class variation and the total variation for each given network input comprises determining the soft nearest neighbor loss as:

$$-\frac{1}{b}\sum_{i=1}^{b} \log R_i$$

where b is a total number of network inputs in the plurality of network inputs, i indexes the given network inputs, and $R_i$ represents the ratio of the intra-class variation and the total variation for the given network input corresponding to index i.

6. The method of claim 2, wherein determining the total variation for the given network input comprises determining:

$$\sum_{j=1\ldots b, j\neq i} \exp\left(-\frac{S(x_i, x_j)}{T}\right),$$

where j indexes the network inputs of the plurality of network inputs, b is a total number of network inputs in the plurality of network inputs, i is an index of the given network input, $x_i$ represents the intermediate representation of the given network input, $x_j$ represents the intermediate representation of the network input corresponding to index j, $S(\cdot,\cdot)$ is a similarity measure, and T is a temperature parameter.

7. The method of claim 1, wherein the classification output that defines the predicted class of the network input comprises a respective likelihood score for each of a plurality of possible classes, wherein the likelihood score for a given class indicates a likelihood that the network input is of the given class.

8. The method of claim 1, further comprising:
determining a classification loss based on the respective classification output that defines the predicted class of each network input; and
adjusting the current values of the classification neural network parameters using gradients of the classification loss with respect to the classification neural network parameters.

9. The method of claim 8, wherein the classification loss comprises a cross-entropy loss.

10. The method of claim 1, wherein the plurality of pairs of network inputs include every possible pair of network inputs that comprise a first network input and a second different network input from the plurality of network inputs.

11. The method of claim 1, wherein the network inputs are images.

12. The method of claim 11, wherein the class of an image defines a category of object depicted in the image.

13. A system comprising:
one or more computers; and
one or more storage devices communicatively coupled to the one or more computers, wherein the one or more storage devices store instructions that, when executed by the one or more computers, cause the one or more computers to perform operations for training a classification neural network, the operations comprising:
for each of a plurality of network inputs:
processing the network input using the classification neural network, in accordance with current values of classification neural network parameters, to generate a classification output that defines a predicted class of the network input;
determining a soft nearest neighbor loss based on, for each of a plurality of pairs of network inputs that comprise a first network input and a second network input from the plurality of network inputs, a respective measure of similarity between:
(i) an intermediate representation of the first network input that is generated by one or more hidden layers of the classification neural network by processing the first network input to generate the classification output for the first network input, and
(ii) an intermediate representation of the second network input that is generated by one or more hidden layers of the classification neural network by processing the second network input to generate the classification output for the second network input;
wherein the soft nearest neighbor loss encourages intermediate representations of network inputs of different classes to become more entangled, wherein the entanglement of intermediate representations of network inputs of different classes characterizes how similar pairs of intermediate representations of network inputs of different class are relative to pairs of intermediate representations of network inputs of the same class; and
adjusting the current values of the classification neural network parameters using gradients of the soft nearest neighbor loss with respect to the classification neural network parameters.

14. The system of claim 13, wherein determining the soft nearest neighbor loss comprises:
for each given network input of the plurality of network inputs:
determining an intra-class variation for the given network input that characterizes how similar the intermediate representation of the given network input is to intermediate representations of other network inputs of the plurality of network inputs that are of the same class as the given network input;
determining a total variation for the given network input that characterizes how similar the intermediate representation of the given network input is to the intermediate representations of other network inputs of the plurality of network inputs that are of any class; and
determining a ratio of the intra-class variation and the total variation for the given network input; and determining the soft nearest neighbor loss based on the respective ratios of the intra-class variation and the total variation for each given network input.

15. The system of claim 14, wherein determining the intra-class variation for the given network input comprises determining:

$$\sum_{j=1...b, j\neq i, y_i=y_j} \exp\left(-\frac{S(x_i, x_j)}{T}\right),$$

where j indexes the network inputs of the plurality of network inputs, b is a total number of network inputs in the plurality of network inputs, i is an index of the given network input, $y_i$ represents a class of the given network input, $y_j$ represents a class of the network input corresponding to index j, $x_i$ represents the intermediate representation of the given network input, $x_j$ represents the intermediate representation of the network input corresponding to index j, $S(\bullet,\bullet)$ a similarity measure, and T is a temperature parameter.

16. The system of claim 15, wherein adjusting the current values of the classification neural network parameters using gradients of the soft nearest neighbor loss with respect to the classification neural network parameters comprises:
adjusting a current value of the temperature parameter using a gradient of the soft nearest neighbor loss with respect to the temperature parameter.

17. The system of claim 14, wherein determining the soft nearest neighbor loss based on the respective ratios of the intra-class variation and the total variation for each given network input comprises determining the soft nearest neighbor loss as:

$$-\frac{1}{b}\sum_{i=1}^{b} \log R_i$$

where b is a total number of network inputs in the plurality of network inputs, indexes the given network inputs, and $R_i$ represents the ratio of the intra-class variation and the total variation for the given network input corresponding to index i.

18. The system of claim 14, wherein determining the total variation for the given network input comprises determining:

$$\sum_{j=1...b, j\neq i} \exp\left(\frac{S(x_i, x_j)}{T}\right),$$

where j indexes the network inputs of the plurality of network inputs, b is a total number of network inputs in the plurality of network inputs, i is an index of the given network input, $x_i$ represents the intermediate representation of the given network input, $x_j$ represents the intermediate representation of the network input corresponding to index j, $S(\bullet,\bullet)$ is a similarity measure, and T is a temperature parameter.

19. The system of claim 13, wherein the classification output that defines the predicted class of the network input comprises a respective likelihood score for each of a plurality of possible classes, wherein the likelihood score for a given class indicates a likelihood that the network input is of the given class.

20. One or more non-transitory computer storage media storing instructions that when executed by one or more computers cause the one or more computers to perform operations for training a classification neural network, the operations comprising:
for each of a plurality of network inputs:
processing the network input using the classification neural network, in accordance with current values of classification neural network parameters, to generate a classification output that defines a predicted class of the network input;
determining a soft nearest neighbor loss based on, for each of a plurality of pairs of network inputs that comprise a first network input and a second network input from the plurality of network inputs, a respective measure of similarity between:
(i) an intermediate representation of the first network input that is generated by one or more hidden layers of the classification neural network by processing the first network input to generate the classification output for the first network input, and
(ii) an intermediate representation of the second network input that is generated by one or more hidden layers of the classification neural network by processing the second network input to generate the classification output for the second network input;
wherein the soft nearest neighbor loss encourages intermediate representations of network inputs of different classes to become more entangled, wherein the entanglement of intermediate representations of network inputs of different classes characterizes how similar pairs of intermediate representations of network inputs of different class are relative to pairs of intermediate representations of network inputs of the same class; and
adjusting the current values of the classification neural network parameters using gradients of the soft nearest neighbor loss with respect to the classification neural network parameters.

\* \* \* \* \*